US009626924B2

United States Patent
Oda et al.

(10) Patent No.: US 9,626,924 B2
(45) Date of Patent: Apr. 18, 2017

(54) DISPLAY AUXILIARY DEVICE, DISPLAY SYSTEM, DISPLAY METHOD, AND PROGRAM MEDIUM

(71) Applicant: CASIO COMPUTER CO., LTD., Shibuya-ku, Tokyo (JP)

(72) Inventors: Kiyoshi Oda, Hino (JP); Ken Yoshino, Koganei (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 272 days.

(21) Appl. No.: 14/302,144

(22) Filed: Jun. 11, 2014

(65) Prior Publication Data

US 2015/0365656 A1 Dec. 17, 2015

(30) Foreign Application Priority Data

Jun. 14, 2013 (JP) .................................. 2013-125636

(51) Int. Cl.
  *G09G 3/00* (2006.01)
  *G09G 3/36* (2006.01)
  *H04N 13/04* (2006.01)

(52) U.S. Cl.
  CPC ........ *G09G 3/3648* (2013.01); *H04N 13/0422* (2013.01); *H04N 13/0427* (2013.01); *H04N 13/0438* (2013.01); *H04N 13/0459* (2013.01); *H04N 2213/008* (2013.01)

(58) Field of Classification Search
  CPC ............. G09G 3/3648; H04N 13/0438; H04N 2213/00
  USPC .......................................................... 348/56
  See application file for complete search history.

(56) References Cited

U.S. PATENT DOCUMENTS

| 5,821,989 A | * | 10/1998 | Lazzaro | ................. | G03B 21/30 |
| | | | | | 348/53 |
| 8,371,702 B2 | | 2/2013 | Macpherson | | |
| 8,665,179 B2 | | 3/2014 | Oda | | |
| 2007/0035707 A1 | * | 2/2007 | Margulis | ................. | G03B 21/26 |
| | | | | | 353/122 |

(Continued)

FOREIGN PATENT DOCUMENTS

| JP | 2001075044 A | 3/2001 |
| JP | 2011070193 A | 4/2011 |

(Continued)

OTHER PUBLICATIONS

Extended European Search Report dated Oct. 27, 2014 issued in counterpart European Application No. 14172138.1.

*Primary Examiner* — Jeffery Williams
(74) *Attorney, Agent, or Firm* — Holtz, Holtz & Volek PC

(57) ABSTRACT

A display auxiliary device includes a light receiving sensor that receives display light from a display target, and a CPU that determines whether or not a switching display synchronous signal is included in the received display light, shields both a left-eye liquid crystal shutter and a right-eye liquid crystal shutter during a light reception period of time of the switching display synchronous signal based on the switching display synchronous signal, and performs a shutter switching operation of the left-eye liquid crystal shutter for the left-eye image and the right-eye liquid crystal shutter for the right-eye image to be switched and displayed, when the switching display synchronous signal is determined to be included.

15 Claims, 6 Drawing Sheets

(56) References Cited

U.S. PATENT DOCUMENTS

| | | | |
|---|---|---|---|
| 2010/0295929 A1* | 11/2010 | Yoshifuji | H04N 13/0438 348/53 |
| 2011/0221925 A1* | 9/2011 | Tajiri | G03B 9/08 348/222.1 |
| 2013/0155209 A1 | 6/2013 | Hara | |

FOREIGN PATENT DOCUMENTS

| | | | |
|---|---|---|---|
| JP | 2011176792 A | 9/2011 | |
| JP | 2012060500 A | 3/2012 | |
| JP | 2012235295 A | 11/2012 | |
| WO | 2012124350 A1 | 9/2012 | |

\* cited by examiner

FIG. 6A
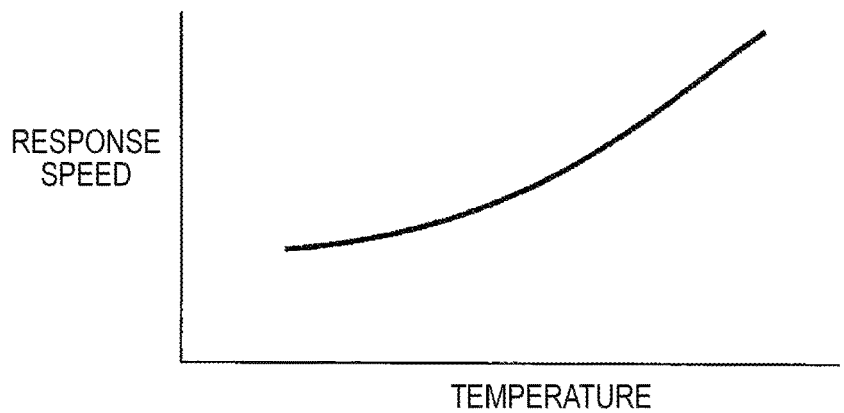
FIG. 6B
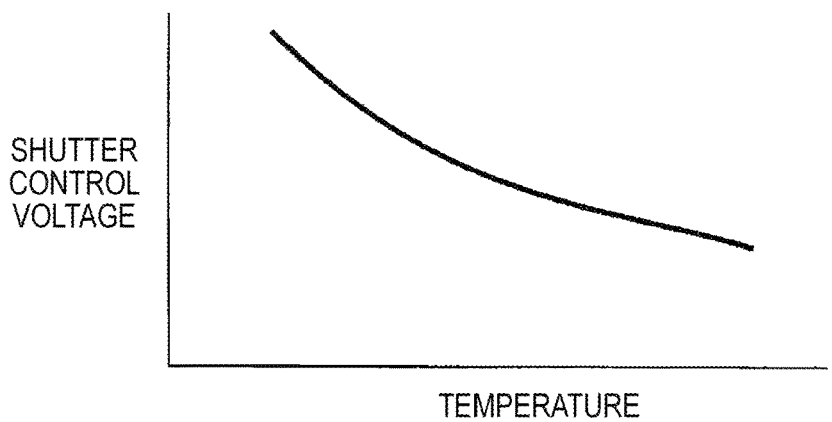
FIG. 6C
| TEMPERATURE [°C] | ... | 0 | 10 | 20 | 30 | ... |
|---|---|---|---|---|---|---|
| CONTROL VOLTAGE [V] | ... | $V_0$ | $V_{10}$ | $V_{20}$ | $V_{30}$ | ... |

DISPLAY AUXILIARY DEVICE, DISPLAY SYSTEM, DISPLAY METHOD, AND PROGRAM MEDIUM

BACKGROUND

1. Technical Field

The present invention relates, particularly, to a display auxiliary device, a display system, a display method, and a program medium that are suitable for a projector of a digital light processing ("DLP (a registered trademark)") type or the like.

2. Related Art

A technique of visualizing a three-dimensional (3D) (stereoscopic) image by projecting the 3D image together with a synchronous pulse in a projector of a DLP (a registered trademark) type has been known (for example, JP 2011-070193 A).

The projector of the DLP type including the technique disclosed in JP 2011-070193 A employs a configuration in which when projection of a 3D image is performed while switching a left-eye image and a right-eye image, a projector side emits a synchronous pulse having high brightness during a very short period of time regardless of an original image signal, and a 3D glasses (viewing glasses) side controls synchronization between the left-eye image and the right-eye image.

Thus, particularly, when a dark image having a small light quantity is projected, a phenomenon called "black floating" that a portion that has to be originally black is projected slightly bright occurs due to influence of a synchronous pulse regardless of a projected image, and it causes the quality of a projected image to deteriorate.

SUMMARY

The present invention has been made in light of the foregoing, and it is an object of the present invention to provide a display auxiliary device, a display system, a display method, and a program medium, which are capable of causing a left-eye image and a right-eye image to be viewed through viewing glasses (display auxiliary device) without incurring black floating for a display device that displays a left-eye image and a right-eye image in a switching manner.

A first aspect of the present invention provides a display auxiliary device that cooperates with a display device having a switching display function of displaying a left-eye image and a right-eye image in a switching manner, and includes a light receiving unit configured to receive display light from a display target, a determining unit configured to determine whether or not a switching display synchronous signal is included in the display light received through the light receiving unit, and a switching control unit configured to shield both a left-eye image and a right-eye image during a light reception period of time of the switching display synchronous signal based on the switching display synchronous signal, and performs a shutter switching operation of a shutter for the left-eye image and a shutter for the right-eye image to be switched and displayed, when the determining unit determines that the switching display synchronous signal is included.

A second aspect of the present invention provides a display system, including: a display device configured to have a switching display function of displaying a left-eye image and a right-eye image in a switching manner; and a display auxiliary device configured to cooperate with the display device, wherein the display device includes a synchronous signal superimposing unit configured to superimpose a switching display synchronous signal on an image to be displayed, and a display unit configured to display the image on which the switching display synchronous signal is superimposed through the synchronous signal superimposing unit, and the display auxiliary device is the display auxiliary device according to the first aspect of the present invention.

A third aspect of the present invention provides a display method of a device configured to cooperate with a display device having a switching display function of displaying a left-eye image and a right-eye image in a switching manner, including the processes of: receiving display light from a display target; determining whether or not a switching display synchronous signal is included in the display light received in the light receiving process; and controlling shutter switching by shielding both a left-eye image and a right-eye image during a light reception period of time of the switching display synchronous signal based on the switching display synchronous signal, and performing a shutter switching operation of a shutter for the left-eye image and a shutter for the right-eye image to be switched and displayed, when the switching display synchronous signal is determined to be included in the determining process.

A fourth aspect of the present invention provides a non-transitory recoding medium storing a program executed by a computer equipped in a device that cooperates with a display device having a switching display function of displaying a left-eye image and a right-eye image in a switching manner, the program causing the computer to function as: a light receiving unit configured to receive display light from a display target; a determining unit configured to determine whether or not a switching display synchronous signal is included in the display light received through the light receiving unit; and a switching control unit configured to shield both a left-eye image and a right-eye image during a light reception period of time of the switching display synchronous signal based on the switching display synchronous signal, and perform a shutter switching operation of a shutter for the left-eye image and a shutter for the right-eye image to be switched and displayed, when the determining unit determines that the switching display synchronous signal is included.

BRIEF DESCRIPTION OF THE DRAWINGS

FIG. 6A is a diagram illustrating response speed characteristics corresponding to a temperature of a liquid crystal panel configuring a lens of the 3D liquid crystal glasses GL according to the embodiment;

FIG. 6B is a diagram illustrating drive control voltage characteristics on a temperature of a liquid crystal panel configuring a lens of the 3D liquid crystal glasses GL according to the embodiment;

FIG. 6C is a diagram illustrating a setting example of a temperature and a drive control voltage of a liquid crystal panel configuring a lens of the 3D liquid crystal glasses GL according to the embodiment.

DETAILED DESCRIPTION

Hereinafter, an embodiment in which the present invention is applied to a projector device of a DLP (a registered trademark) type will be described with reference to the appended drawings.

Figure 1:
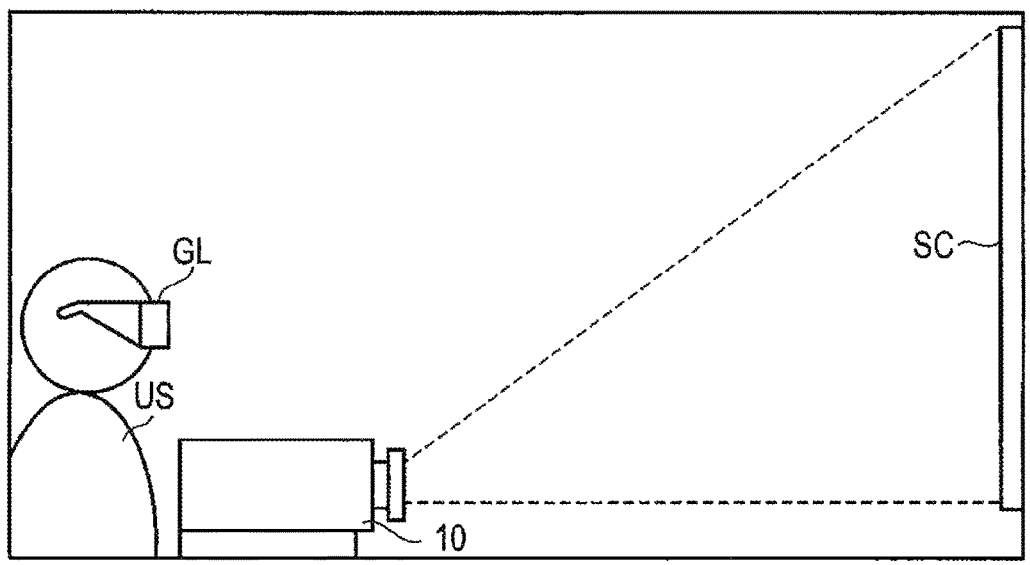
FIG. 1 is a diagram illustrating a projection environment of a projector system according to an embodiment of the present invention.

FIG. 1 is a diagram illustrating an environment of a projection system including a projector device 10 according to the embodiment.

As illustrated in FIG. 1, a user US wearing 3D liquid crystal glasses GL (viewing glasses or a display auxiliary device) views an image projected onto a screen SC from the projector device 10.

Figure 2:
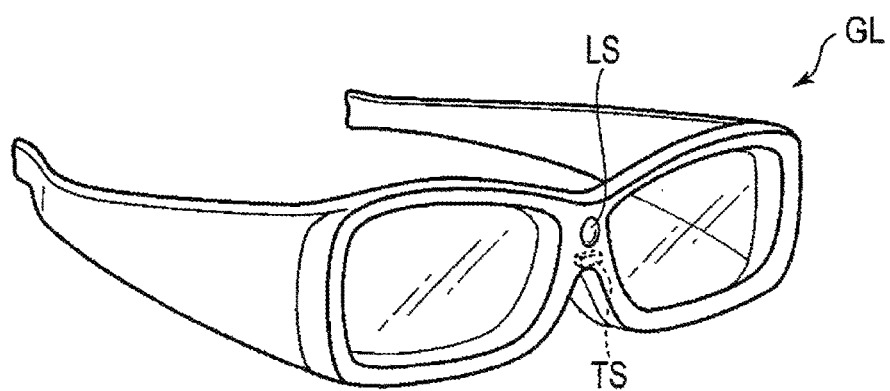
FIG. 2 is a perspective view illustrating an external configuration of 3D liquid crystal glasses according to the embodiment.

FIG. 2 is a perspective view illustrating an external configuration of the 3D liquid crystal glasses GL.

The 3D liquid crystal glasses GL are over-glasses that can be worn and used even by the user US being wearing glasses, and a light receiving sensor LS is arranged at a front side of a bridge portion at the center thereof.

The light receiving sensor LS detects a change in illuminance of the screen SC plane when it faces the screen SC.

As left and right lenses configured with transmission type monochrome liquid crystal panels are alternately caused to shield/transmit in synchronization with a synchronous signal superimposed on a projection image received through the light receiving sensor LS, the user US can view a stereoscopic image.

A temperature sensor TS is embedded at a position that is affected as little as possible by a body temperature of the user US below the light receiving sensor LS.

The temperature sensor TS is arranged to detect temperatures of the left and right lenses of the 3D liquid crystal glasses GL under the environment around the 3D liquid crystal glasses GL.

A power key (not illustrated) for turning on or off electric power of the 3D liquid crystal glasses GL is arranged at an appropriate position.

Figure 3:
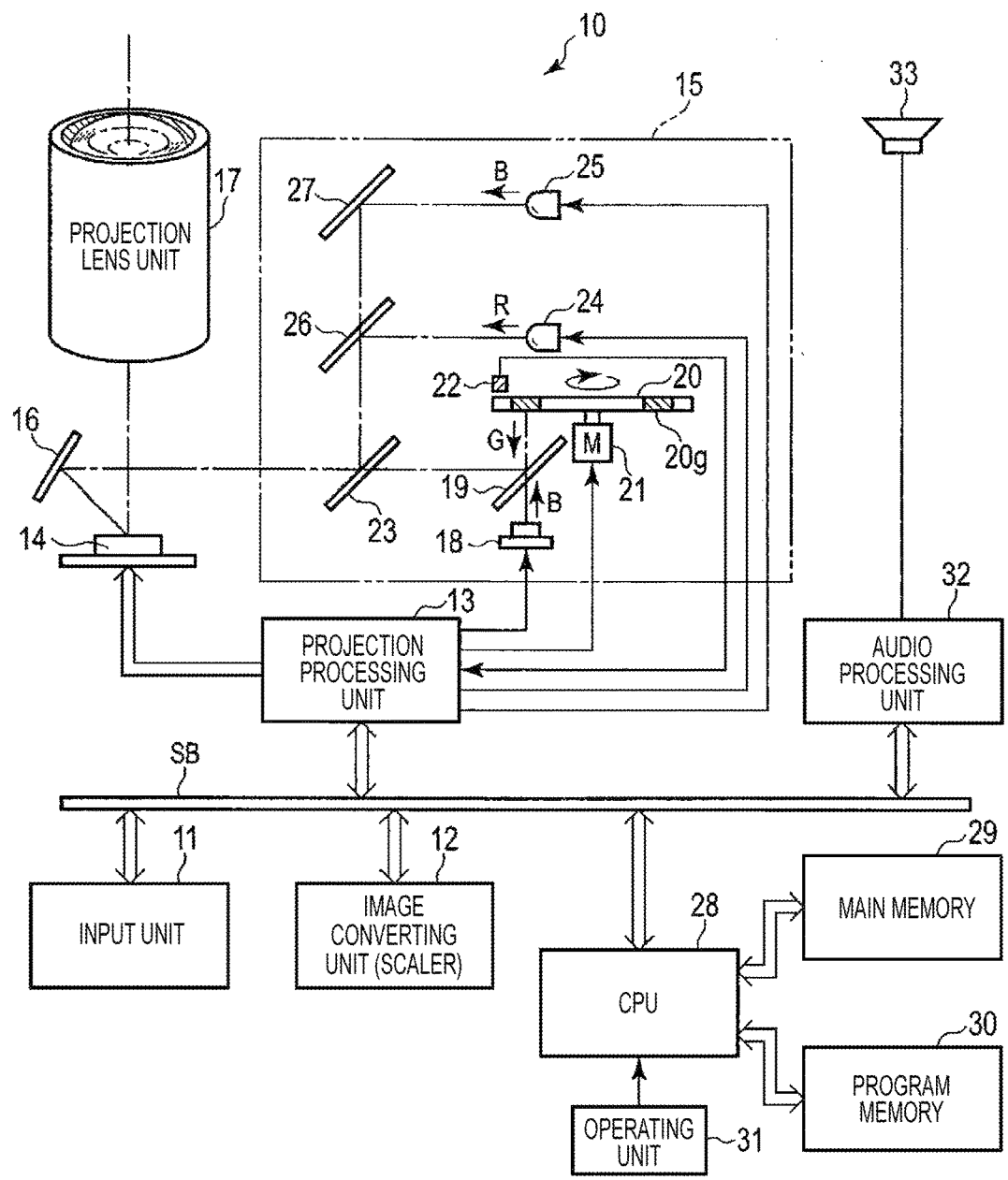
FIG. 3 is a block diagram illustrating a schematic configuration of a functional circuit of a projector device according to the embodiment.

Next, a schematic configuration of a functional circuit in the projector device 10 will be described with reference to FIG. 3.

For example, an input unit 11 is configured with a video input terminal of a pin jack (RCA) type, a RGB input terminal of a D-sub 15 type, and the like.

Analog image signals conforming to various kinds of standards input to the input unit 11 are converted into digital signals through the input unit 11 as necessary, and transferred to an image converting unit 12 via system bus SB.

The image converting unit 12 is called a scalar, and unifies input image data into image data of a certain format suitable for projection, and transfers resultant image data to a projection processing unit 13.

The projection processing unit 13 drives a micro mirror element 14 that is a spatial optical modulation element for a display according to received image data by high-speed time division driving in which a frame rate (for example, 120 [frame/sec]) according to a certain format is multiplied by a division number of a color component and a display gradation number.

The micro mirror element 14 individually turns on or off tilt angles of a plurality of micro mirrors (for example, micro mirrors corresponding to a Wide eXtended Graphic Array (WXGA)) (1280 (horizontal) pixels×800 pixels (vertical)) arranged in an array form at a high speed to display an image, and forms an optical image by reflected light thereof.

Meanwhile, primary colors of light of R, G, and B are circularly emitted from a light source unit 15 in a time division manner.

The primary colors of light output from the light source unit 15 are totally reflected by a mirror 16 and radiated to the micro mirror element 14.

Then, the light reflected by the micro mirror element 14 forms an optical image, the formed optical image is projected onto and displayed on a screen (not illustrated) serving as a projection target through a projection lens unit 17.

The light source unit 15 includes a laser diode (LD) 18 that emits blue laser beams.

The blue laser beams emitted from the LD 18 pass through a dichroic mirror 19 and then are radiated to a peripheral surface of a fluorescent wheel 20.

The fluorescent wheel 20 is rotated by a wheel motor (M) 21, and a phosphor layer 20g is formed on the entire peripheral surface irradiated with the blue laser beams.

A reflective plate (not illustrated) that overlaps the phosphor layer 20g is arranged at the back side of the surface of the fluorescent wheel 20 on which the phosphor layer 20g is formed.

Further, a wheel marker (not illustrated) indicating a reference rotational position for obtaining rotational synchronization of the fluorescent wheel 20 is arranged at one end of the peripheral surface of the fluorescent wheel 20.

The projection processing unit 13 monitors a rotational status as to whether or not the fluorescent wheel 20 is normally rotating based on a detection signal received from a marker sensor 22.

As blue laser beams are radiated to the phosphor layer 20g of the fluorescent wheel 20, green light is excited as reflected light.

The green light is reflected by the dichroic mirror 19, passes through a dichroic mirror 23, and arrives at the mirror 16.

Further, the light source unit 15 includes a light-emitting diode (LED) 24 that emits red light and an LED 25 that emits blue light.

The red light emitted from the LED 24 is reflected by a dichroic mirror 26, reflected by the dichroic mirror 23, and arrives at the mirror 16.

The blue light emitted from the LED 25 is totally reflected by the mirror 27, passes through the dichroic mirror 26, is then reflected by the dichroic mirror 23, and arrives at the mirror 16.

As described above, the dichroic mirror 19 transmits the blue light but reflects the green light.

The dichroic mirror 23 transmits the green light but reflects the red light and the blue light.

The dichroic mirror 26 reflects the red light but transmits the blue light.

The projection processing unit 13 forms an optical image by an image display through the micro mirror element 14, emits light through the LD 18 and the LEDs 24 and 25, rotates the fluorescent wheel 20 through the wheel motor 21, and detects the rotational status of the fluorescent wheel 20 through the marker sensor 22 under control of a central processing unit (CPU) 28.

All operations of the above circuits are controlled by the CPU 28.

The CPU 28 is connected directly with a main memory 29 and a program memory 30.

For example, the main memory 29 is configured with a static random access memory (SRAM), and functions as a work memory of the CPU 28.

The program memory 30 is configured with an electrically re-writable non-volatile memory, and stores an operation program executed by the CPU 28, various kinds of regular data, and the like.

The CPU 28 performs a control operation for the projector device 10 using the main memory 29 and the program memory 30.

The CPU 28 executes various kinds of projection operations according to a key operation signal received from an operating unit 31.

The operating unit 31 includes a key operating unit installed in the main body of the projector device 10 and a laser beam receiving unit that receives infrared light from a remote controller (not illustrated) dedicated for the projector device 10, and outputs the key operation signal directly to the CPU 28 based on a key operated by the user using the key operating unit of the main body or the remote controller.

The CPU 28 is also connected to an audio processing unit 32 via the system bus SB.

The audio processing unit 32 includes a sound source circuit of a pulse coded modulation (PCM) sound source or the like, and converts audio data applied at the time of projection operation into analog data, and drives a speaker unit 33 to amplify or emit a sound or generate a beep sound or the like as necessary.

Figure 4:
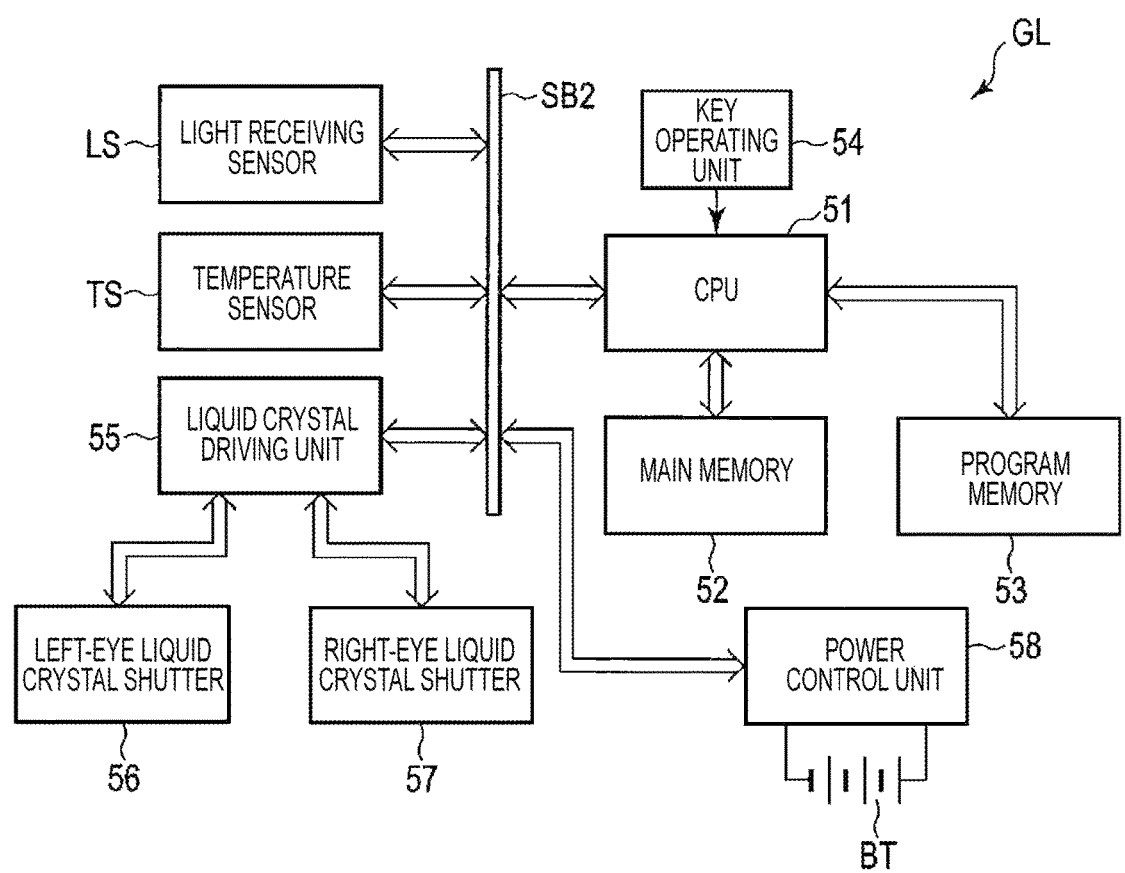
FIG. 4 is a block diagram illustrating a schematic configuration of a functional circuit of 3D liquid crystal glasses GL according to the embodiment.

Next, a functional configuration of the 3D liquid crystal glasses GL will be described with reference to FIG. 4.

Both information of the illuminance of the screen SC detected by the light receiving sensor LS and information of the temperature detected by the temperature sensor TS are converted into digital data and then transferred to a CPU 51 via a system bus SB2.

The CPU 51 undertakes an overall control operation related to the 3D liquid crystal glasses GL, and a main memory 52 and a program memory 53 are connected directly with the CPU 51.

The main memory 52 functions as a work memory of the CPU 51.

The program memory 53 stores an operation program executed by the CPU 51, various kinds of regular data, and the like.

The CPU 51 executes a control operation of the 3D liquid crystal glasses GL using the main memory 52 and the program memory 53.

A key operation signal from a key operating unit 54 is also input directly to the CPU 51.

The key operating unit 54 includes a power key of turning on or off electric power of the 3D liquid crystal glasses GL.

Further, the CPU 51 is connected with a liquid crystal driving unit 55 and a power control unit 58 via the system bus SB2.

The liquid crystal driving unit 55 drives a left-eye liquid crystal shutter 56 configuring a left-eye lens of the 3D liquid crystal glasses GL and a right-eye liquid crystal shutter 57 configuring a right-eye lens to alternately perform shielding/transmitting under control of the CPU 51.

The power control unit 58 collectively controls power supply from a rechargeable battery BT serving as a power source of the 3D liquid crystal glasses GL, and supplies electric power converted to direct current (DC) power necessary for the other circuits under control of the CPU 51.

Next, an operation of the above embodiment will be described.

Although repeated, in the projector device 10, all operations described below are executed after the CPU 28 develops an operation program, fixed data, and the like read from the program memory 30 onto the main memory 29 and stores the operation program, the fixed data, and the like in the main memory 29.

Further, for simplification of description, a frame of each of left-eye and right-eye color images is assumed to be configured with a total of 4 fields, that is, a synchronization field and 3 fields of B (blue), R (red), and G (green).

Figure 5:
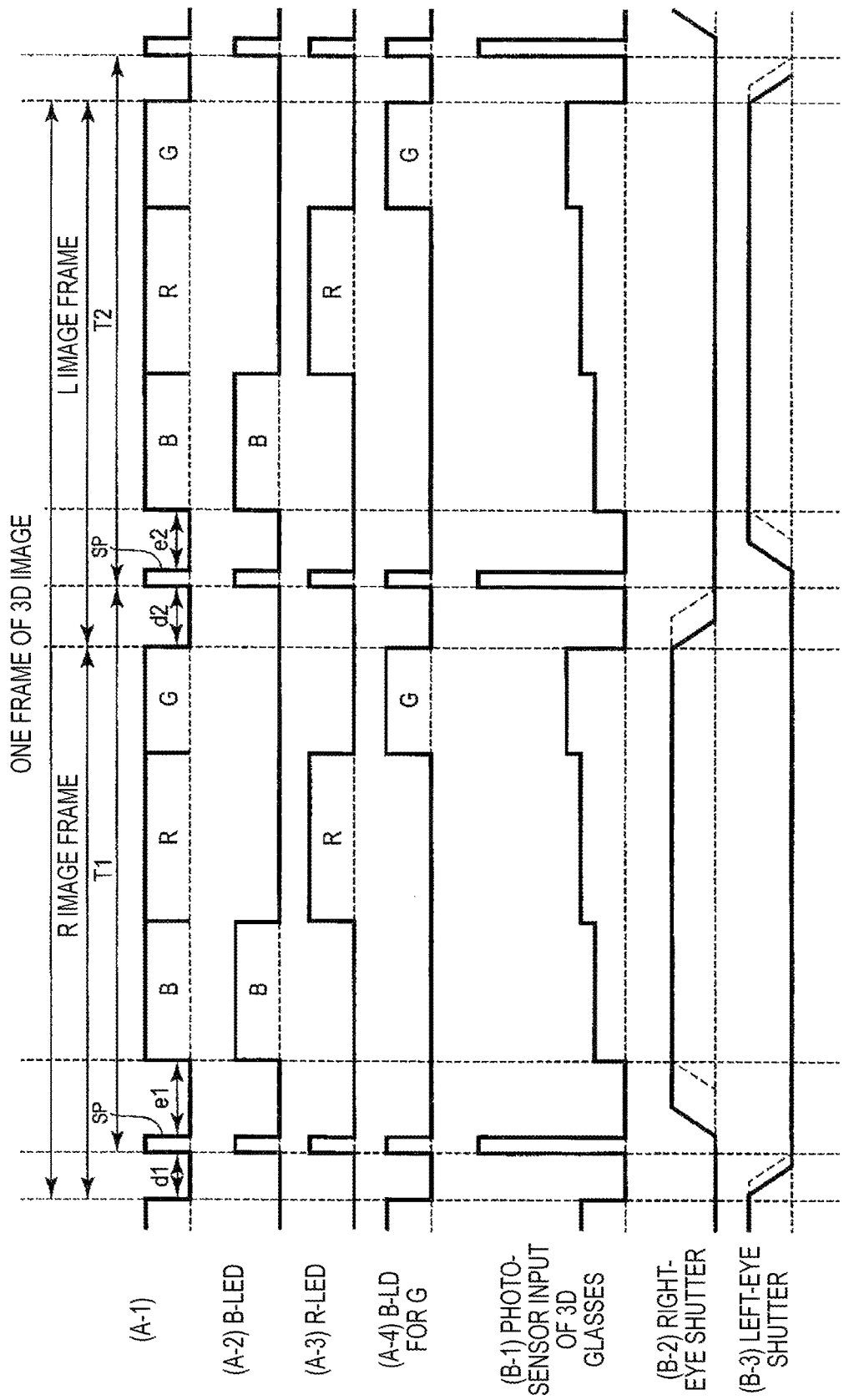
FIG. 5 is a timing chart of light source driving at the time of 3D image projection according to the embodiment.

FIG. 5 illustrates light-emission timings of the light source unit 15 of the projector device 10 in 2 frames configuring a 3D image frame, that is, one frame for a right-eye (R) image and one frame for a left-eye (L) image, and an operation of the 3D liquid crystal glasses GL.

(A-1) to (A-4) of FIG. 5 illustrate an operation of the projector device 10.

(A-1) of FIG. 5 illustrates light-emission timings of the whole projector device.

(A-2) to (A-4) of FIG. 5 illustrate light-emission timings of the LED 25 that emits blue (B) light, the LED 24 that emits red (R) light, and the LD 18 that emits blue light to excite green (G) light by a phosphor.

(B-1) to (B-3) of FIG. 5 illustrate an shutter switching operation of the 3D liquid crystal glasses GL that operates according to an image projected by the projector device 10.

(B-1) of FIG. 5 illustrates a change in a light quantity input to the light receiving sensor LS of the 3D liquid crystal glasses GL facing the screen SC when the projector device 10 performs projection on the screen SC.

(B-2) and (B-3) of FIG. 5 illustrate on (transmitting) and off (shielding) states of the right-eye liquid crystal shutter 57 and the left-eye liquid crystal shutter 56, respectively.

As illustrated in (A-1) of FIG. 5, in the right-eye (R) image frame projected by the projector device 10, all of the LD 18, the LED 24, and the LED 25 that are semiconductor light-emitting elements serving as a light source are turned off at the beginning of the synchronization field, and the LD 18, the LED 24, and the LED 25 are simultaneously turned on by the projection processing unit 13 as a synchronous signal SP during a period of time corresponding to a specified pulse width, for example, 1/180 of a L/R frame from a timing at which a period of time d1 has elapsed.

Thus, white light generated by color mixture of G, R, and B is radiated to the micro mirror element 14, and the micro mirror element 14 causes all radiated light to be reflected light to be directed to the projection lens unit 17 by total reflection during this period of time.

As a result, an image of high brightness causing the entire plane of the screen SC to be white is projected onto the screen SC during a short period of time not perceived by the user US.

(However, an image of high brightness projected during this short period of time causes "black floating".)

Thereafter, the projection processing unit 13 turns off all of the LD 18, the LED 24, and the LED 25 again during a period of time e1 until the synchronization field ends.

During a subsequent B field period of time, only the LED 25 is driven to be turned on.

The micro mirror element 14 forms a right-eye blue optical image by the blue light emitted from the LED 25, and the optical image is projected onto the screen SC through the projection lens unit 17.

During a subsequent R field period of time, only the LED 24 is driven to be turned on.

The micro mirror element 14 forms a right-eye red optical image by the red light emitted from the LED 24, and the optical image is projected onto the screen SC through the projection lens unit 17.

During a subsequent G field period of time, only the LD 18 is driven to be turned on.

The micro mirror element 14 forms a right-eye green optical image by green light obtained by radiating the blue light emitted from the LD 18 to the phosphor layer 20g of the fluorescent wheel 20, and the optical image is projected onto the screen SC through the projection lens unit 17.

Thereafter, in the left-eye (L) image frame, all of the LD 18, the LED 24, and the LED 25 that are semiconductor light-emitting elements serving as a light source are turned off at the beginning of the synchronization field, and the LD 18, the LED 24, and the LED 25 are simultaneously turned on by the projection processing unit 13 as the synchronous signal SP during a period of time corresponding to a specified pulse width, for example, 1/180 of a L/R frame from a timing at which a period of time d2 has elapsed.

Thus, white light generated by color mixture of G, R, and B is radiated to the micro mirror element 14, and the micro mirror element 14 causes all radiated light to be reflected light to be directed to the projection lens unit 17 by total reflection during this period of time.

As a result, an image of high brightness causing the entire plane of the screen SC to be white is projected onto the screen SC during a short period of time not perceived by the user US.

(However, an image of high brightness projected during this short period of time causes "black floating".)

Thereafter, the projection processing unit 13 turns off all of the LD 18, the LED 24, and the LED 25 again during a period of time e2 until the synchronization field ends.

Then, in the B field period of time, only the LED 25 is driven to be turned on.

The micro mirror element 14 forms a left-eye blue optical image by the blue light emitted from the LED 25, and the optical image is projected onto the screen SC through the projection lens unit 17.

During a subsequent R field period of time, only the LED 24 is driven to be turned on.

The micro mirror element 14 forms a left-eye red optical image by the red light emitted from the LED 24, and the optical image is projected onto the screen SC through the projection lens unit 17.

Then, in the G field period of time, only the LD 18 is driven to be turned on.

The micro mirror element 14 forms a left-eye green optical image by green light obtained by radiating the blue light emitted from the LD 18 to the phosphor layer 20g of the fluorescent wheel 20, and the optical image is projected onto the screen SC through the projection lens unit 17.

The delay period of time d2 at the beginning of the left-eye (L) image frame is set to a value larger than the delay period of time d1 used in the right-eye (R) image frame.

Thus, due to a difference Δd (=d2−d1) in the delay period of time, a cycle T1 until the pulse of the synchronous signal SP is emitted in the left-eye (L) image frame after the pulse of the synchronous signal SP is emitted in the right-eye (R) image frame is larger than a cycle T2 until the pulse of the synchronous signal SP is emitted in the right-eye (R) image frame belonging to a next 3D image frame after the pulse of the synchronous signal SP is emitted in the left-eye (L) image frame by 2Δd.

(B-1) of FIG. 5 illustrates intensity of light incident to the light receiving sensor LS of the 3D liquid crystal glasses GL by an image projected by the projector device 10.

Levels corresponding to the fields of B, R, and G indicate incident light quantities for optical images formed by light emission of the semiconductor light-emitting elements of single colors, and the incident light quantity is higher in the order of B<R<G due to a difference in brightness of the color components.

On the other hand, a level corresponding to the synchronous signal SP of the synchronization field at the beginning of each frame indicates a light quantity for a mixed color obtained by simultaneous light emission of 3 colors.

Thus, the CPU 51 can easily identify only the synchronous signal SP by a comparison with a predetermined threshold value larger than the level corresponding to the G field, and can easily determine whether a projected image subsequent to the synchronous signal SP is a right-eye image or a left-eye image by calculating and comparing cycles T between the pulses of the synchronous signal SP in sequence.

Further, the CPU 51 causes the left-eye liquid crystal shutter 56 to transition to the off (shielding) state at the same time as the start of the delay period of time d1 of the synchronization field at which the synchronization field of the right-eye (R) image frame at the beginning of a new 3D image frame starts after the last G field period of time of the previous left-eye (L) image frame ends.

At this time, since the right-eye liquid crystal shutter 57 side is still in the off (shielding) state from the previous left-eye (L) image frame, at a timing at which the pulse of the synchronous signal SP is received by the light receiving sensor LS, both the right-eye liquid crystal shutter 57 and the left-eye liquid crystal shutter 56 are in the off (shielding) state, and light including the pulse of the synchronous signal SP does not enter both eyes of the user US.

Thereafter, the CPU 51 causes the right-eye liquid crystal shutter 57 to transition to the on (transmitting) state according to a timing at which the pulse of the synchronous signal SP ends, and the period of time e1 starts.

Further, the CPU 51 of the 3D liquid crystal glasses GL causes the right-eye liquid crystal shutter 57 to transition to the off (shielding) state at the same time as the start of the delay period of time d2 of the synchronization field at which the last G field period of time of the right-eye (R) image frame ends, and the synchronization field of the next left-eye (R) image frame starts.

At this time, since the right-eye liquid crystal shutter 57 side is still in the off (shielding) state from the previous left-eye (L) image frame, at a timing at which the pulse of the synchronous signal SP is received by the light receiving sensor LS, both the right-eye liquid crystal shutter 57 and the left-eye liquid crystal shutter 56 are in the off (shielding) state, and light including the pulse of the synchronous signal SP does not enter both eyes of the user US.

Thereafter, the CPU 51 causes the left-eye liquid crystal shutter 56 to transition to the on (transmitting) state according to the start timing of the period of time e2 at which the pulse of the synchronous signal SP ends.

Generally, in the liquid crystal panel, even in the case of a ferroelectric liquid crystal, transition from the off (shielding) state to the on (transmitting) state or transition from the on (transmitting) state to the off (shielding) state takes a period of time of several tens of [nsec] to 1 [msec] order depending on a response speed, and as illustrated in (B-2) of FIG. 5 and (B-3) of FIG. 5, a waveform at the time of transition has neither abrupt rising nor falling but changes with a gentle slope (steadily) instead.

Thus, in the present embodiment, the CPU 51 controls driving of the right-eye liquid crystal shutter 57 and the left-eye liquid crystal shutter 56 through the liquid crystal driving unit 55 such that although a response is delayed at the time of transition from the on (transmitting) state to the off (shielding) state, transition to the off (shielding) state is reliably performed at at least a timing of the pulse of the next synchronous signal SP as indicated by wavy lines in the drawings.

This is to cause the pulse light of the synchronous signal SP not to enter both eyes of the user US.

Similarly, the CPU 51 controls driving of the right-eye liquid crystal shutter 57 and the left-eye liquid crystal shutter 56 through the liquid crystal driving unit 55 such that although a response is delayed at the time of transition from the off (shielding) state to the on (transmitting) state, transition to the on (transmitting) state is reliably performed at at least a timing at which the B field period of time starts as the next image projection period of time.

This is to enable the user US to reliably view the projected image.

In this case, as the switching speed to the on (transmitting) state is appropriately set such that transition to the on (transmitting) state is reliably performed at a timing at which the B field period of time starts without unnecessarily increasing the switching speed, electric power necessary for driving of each liquid crystal shutter is reduced, and thus power consumption can be reduced.

Further, the liquid crystal display panel configuring the right-eye liquid crystal shutter 57 or the left-eye liquid crystal shutter 56 has the response speed that greatly changes according to the temperature of the ambient environment.

FIG. 6A illustrates an example of change characteristics of the response speed of the liquid crystal display panel on the ambient temperature.

As can be seen from FIG. 6A, as the ambient temperature increases, a liquid crystal material layer sealed in the panel becomes active, and the response speed increases.

Thus, the CPU 51 controlling the operations of the right-eye liquid crystal shutter 57 and the left-eye liquid crystal shutter 56 performs an adjustment such that a control drive voltage applied to the right-eye liquid crystal shutter 57 and the left-eye liquid crystal shutter 56 by the liquid crystal driving unit 55 is intentionally decreased as the ambient temperature increases as illustrated in FIG. 6B.

As such control is performed, it is possible to avoid influence of an environmental change and to constantly cause the right-eye liquid crystal shutter 57 and the left-eye liquid crystal shutter 56 to perform the switching operation at a constant response speed, and it is possible to further reduce power consumption of the 3D liquid crystal glasses GL with the rechargeable battery BT having the limited power capacity, and thus it is possible to increase an operation period of time (a 3D viewable period of time).

FIG. 6C illustrates content of a correspondence between the ambient temperature and the control voltage that are set to the inside of the CPU 51 or the liquid crystal driving unit 55 through the CPU 51 and used to control the right-eye liquid crystal shutter 57 and the left-eye liquid crystal shutter 56 through the CPU 51.

The CPU 51 reads a control voltage value Vx [V] from a table of FIG. 6C according to a temperature x [° C.] detected by the temperature sensor TS, and uses the read control voltage value Vx [V] as a drive voltage for the right-eye liquid crystal shutter 57 and the left-eye liquid crystal shutter 56.

As the control voltages are stored in the table form, it is unnecessary to calculate an operation voltage by a calculation each time, and thus it is possible to reduce a processing load of the CPU 51.

The above embodiment have been described in connection with the example in the 3D display device performing a 3D display (a stereoscopic display) by parallax between both images as the display device that displays the left-eye image and the right-eye image in the switching manner, and the 3D glasses as the display auxiliary device (viewing glasses), but the present invention is not limited to this example.

For example, the present invention can be applied to a display system in which individual images are displayed in a time division manner without using parallax.

As described above, according to the present embodiment, in the 3D liquid crystal glasses GL (the viewing glasses or the display auxiliary device) for the projector device 10 (the display device) that displays the left-eye image and the right-eye image in the switching manner, control is performed such that both the left-eye liquid crystal shutter 56 and the right-eye liquid crystal shutter 57 enter the off (shielding) state at a timing at which the pulse of the synchronous signal SP (the switching display synchronous signal) is received, and thus it is possible to cause the corresponding left-eye image and the right-eye image to be viewed without incurring the black floating.

Further, in the above embodiment, information indicating the temperature of the environment in which the 3D liquid crystal glasses GL are used is acquired, and then the drive voltage for the left-eye liquid crystal shutter 56 and the right-eye liquid crystal shutter 57 is adjusted, and thus it is possible to prevent the occurrence of crosstalk of the left-eye image and the right-eye image and increase the operation period of time by appropriately managing the power consumption of the 3D liquid crystal glasses GL.

At this point, the 3D liquid crystal glasses GL itself include the temperature sensor TS, and acquires information of the ambient temperature. Thus, the 3D liquid crystal glasses GL can perform a control operation by itself, a communication function with an external device or the like is not necessary, and so the device (system) can be simplified.

Further, in the above embodiment, the shutter switching operation of causing either of the left-eye liquid crystal shutter 56 or the right-eye liquid crystal shutter 57 to enter the on (transmitting) state starts at a timing at which the receiving of the pulse of the synchronous signal SP ends. Thus, it is possible to perform transition to the on (transmitting) state at as early stage as possible and prepare to enable the user US to reliably view the displayed image while preventing the pulse of the synchronous signal SP from being viewed by the user US.

Meanwhile, in the above embodiment, the shutter switching operation of causing either of the left-eye liquid crystal shutter 56 or the right-eye liquid crystal shutter 57 to enter the off (shielding) state starts according to a timing at which the image projection period of time ends. Thus, in light of a case in which the response speed of the liquid crystal shutter is slow, control can be performed such that the left-eye liquid crystal shutter 56 and the right-eye liquid crystal shutter 57 reliably enter the off (shielding) state at a timing at which the pulse of the synchronous signal SP is received, and wasteful power consumption can be reduced.

Further, in the above embodiment, the 3D liquid crystal glasses GL (the viewing glasses) includes the light receiving sensor LS, and it is determined whether or not an 3D image or the like is projected such that the left-eye image and the right-eye image are displayed in the switching manner, based on whether or not the pulse light of the synchronous signal SP having the relative large intensity is periodically received. Thus, the projector device 10 need not transmit an infrared-ray signal for synchronization or the like in addition to the projection image, and it can be easily determined whether or not a 3D image or the like is projected such that the left-eye image and the right-eye image are displayed in the switching manner.

In addition, the pulse light of the synchronous signal SP indicates either of the display period of time of the left-eye image or the display period of time of the right-eye image according to a time interval thereof (a signal interval). Thus, the left and right images can be reliably determined through simple control.

Here, the display period of time of the left-eye image and the display period of time of the right-eye image are determined according to the time interval, but for example, the determination may be made according to the pulse width of the synchronous signal SP.

The above embodiment has been described in connection with the example in which the temperature sensor TS is installed at the 3D liquid crystal glasses GL side, and the liquid crystal driving temperature is compensated. However, a temperature detecting unit for detecting the ambient temperature may be installed at the projector device 10 side, and a notification of information of the temperature detected at the projector device 10 side may be given (transmitted) to the 3D liquid crystal glasses GL side through a certain communication unit.

In this case, the frequency at which the temperature information is transmitted may be the low frequency such as intervals of several minutes.

Further, for example, a configuration in which coded temperature information is superimposed on the synchronous signal SP and notified (transmitted) is also considered.

More specifically, for example, the projector device 10 may notify of the temperature information such that the pulse width of the synchronous signal SP is short when the temperature is low, and the pulse width of the synchronous signal SP is long when the temperature is high, and the 3D liquid crystal glasses GL side may recognize the pulse width of the synchronous signal SP and acquire the temperature information.

Further, the temperature information may be superimposed according to a change in the waveform of the synchronous signal SP.

More specifically, for example, the temperature information can be superimposed on the synchronous signal SP according to a feature of the waveform such as whether the synchronous signal has a rectangular shape or a sawtooth shape.

In this case, it is unnecessary to install the temperature sensor at the 3D liquid crystal glasses GL side.

Further, the left-eye liquid crystal shutter 56 and the right-eye liquid crystal shutter 57 can be switched at an appropriate voltage according to the temperature characteristics of the 3D liquid crystal glasses GL side.

Further, the temperature acquiring units may be used together or switched.

Further, the above embodiment has been described in connection with the example in which the present invention is applied to the projector device of the DLP (a registered trademark) type and the 3D liquid crystal glasses. However, the present invention can be similarly to a device through which the user can directly view a display screen through 3D liquid crystal glasses as well as a device performing projection.

Figure 7:
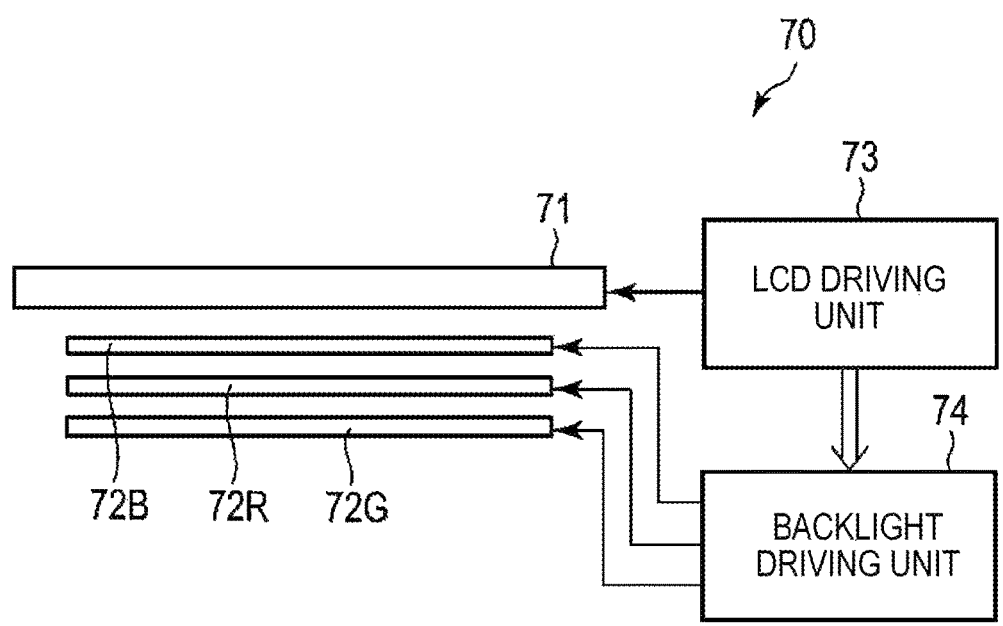
FIG. 7 is a diagram illustrating an exemplary configuration of a display device according to another embodiment of the present invention.

FIG. 7 illustrates an exemplary configuration when a liquid crystal panel display 70 of a field sequential (color sequential) type is applied as the display device.

In FIG. 7, reference numeral 71 denotes a transmission type monochrome liquid crystal panel.

Further, sheet-like backlight units 72B, 72R, and 72G are laminatedly arranged at the bottom side of the monochrome liquid crystal panel 71.

The backlight units 72B, 72R, and 72G configure units, more accurately, units of a sidelight type in which LEDs emitting B (blue) light, R (red) light, and G (green) light are arrayed in a line form at 4 sides of a rectangular waveguide diffusing plate.

Primary colors of light by surface emission emitted from units at a lower layer side apart from the monochrome liquid crystal panel 71 pass through the units at a layer side thereabove and then are radiated to the monochrome liquid crystal panel 71 from the bottom side thereof, and thus, optical images according to the primary colors of light are formed by images of the primary color components of light displayed through the monochrome liquid crystal panel 71 at that timing.

Here, the primary colors of light emitted from the backlight units 72B, 72R, and 72G are higher in brightness component in the order of B<R<G, for example, and so the higher the brightness component the primary color of light has, the lower the layer from which the primary color of light is emitted is. Thus, since the light quantity decreases while passing through the unit in the middle, color balance is appropriately obtained when optical images of primary colors are formed (modulated to a spatial image) through the monochrome liquid crystal panel 71.

An LCD driving unit 73 performs an image display in the monochrome liquid crystal panel 71.

The LCD driving unit 73 outputs a timing signal according to a timing of images of primary colors to be displayed by the monochrome liquid crystal panel 71 and a control signal indicating a light emission quantity to a backlight driving unit 74.

The backlight driving unit 74 circularly drives the backlight units 72B, 72R, and 72G to perform surface emission in the time division manner according to the timing signal and the control signal received from the LCD driving unit 73.

For example, when one frame of a color image is configured with 3 fields of R, G, and B, the LCD driving unit 73 drives the monochrome liquid crystal panel 71, for example, at a frame rate of 120 [frame/sec] to display images of primary colors at a speed of 360 [field/sec], and the user of the liquid crystal panel display 70 views the monochrome liquid crystal panel 71 from above and thus can view a color image without discomfort.

In the liquid crystal panel display 70 that is a kind of the above-described display device in which the monochrome liquid crystal panel 71 as the display screen is directly viewed, white light of a mixed color can be emitted by performing gradation control such that the backlight units 72B, 72R, and 72G emit light at the same time in a very short period of time, and all pixels of the monochrome liquid crystal panel 71 enter a full-transmission state, and the white light can be used as a synchronous signal for a 3D display.

Such a direct-view type display device can be also applied to, for example, a display system in which individual images are displayed in the time division manner without using parallax.

Further, the present invention is not limited to the liquid crystal panel display of the field sequential (color sequential) type whose structure is illustrated in FIG. 7, and can be similarly applied to a display device using any other light source such as a liquid crystal projector, a plasma display, or a monitor device of a SED rear projector type.

Besides, the present invention is not limited to the above embodiments, and various modifications can be made within a range not departing from the gist thereof at an implementation stage.

Further, the functions executed in the above embodiments may be appropriately combined and implemented if possible.

In the above embodiments, various stages are included, and various inventions can be derived by an appropriate combination of a plurality of disclosed components.

For example, even when some components are deleted from the entire configuration disclosed in the embodiment, a configuration in which the components are deleted can be derived as the invention if the effect is obtained.

What is claimed is:

1. A display auxiliary device that cooperates with a display device having a switching display function of displaying a left-eye image and a right-eye image in a switching manner, the display auxiliary device comprising:
    a light receiving sensor configured to receive display light from a display target; and
    a processor which is configured to:
    determine whether or not a switching display synchronous signal is included in the display light received through the light receiving sensor;
    perform a shutter switching operation of a shutter for the left-eye image and a shutter for the right-eye image to be switched and displayed, when it is determined that the switching display synchronous signal is included in the display light;
    perform a shielding operation of controlling both the shutter for the left-eye image and the shutter for the right eye-image to shield the left-eye image and the right-eye image, respectively, during an all light reception period of the switching display synchronous signal such that both the left-eye image and the right-eye image are shielded during the all light reception period of the switching display synchronous signal;
    analyze a feature of the switching display synchronous signal;
    acquire temperature information of an environment in which the display auxiliary device is used, based on the analyzed feature of the switching display synchronous signal; and
    change a drive status of the shutter switching operation based on the acquired temperature information.

2. The display auxiliary device according to claim 1, further comprising a temperature sensor,
    wherein the processor acquires the temperature information of the environment in which the display auxiliary device is used through the temperature sensor.

3. The display auxiliary device according to claim 1, wherein the processor acquires the temperature information based on a pulse width of the switching display synchronous signal as the analyzed feature of the switching display synchronous signal.

4. The display auxiliary device according to claim 1, wherein the processor acquires the temperature information based on a waveform of the switching display synchronous signal as the analyzed feature of the switching display synchronous signal.

5. The display auxiliary device according to claim 1, wherein the processor starts the shutter switching operation to transmit either of the left-eye image or the right-eye image according to a timing at which reception of the switching display synchronous signal ends.

6. The display auxiliary device according to claim 1, wherein the processor recognizes display periods of time of the left-eye image and the right-eye image based on the switching display synchronous signal, and starts the shutter switching operation to shield the corresponding one of the left-eye image and the right-eye image according to end timings of the display periods of time.

7. The display auxiliary device according to claim 1, wherein the processor determines whether or not the switching display synchronous signal is included based on whether pulse light having intensity larger than a threshold is periodically received through the light sensor.

8. The display auxiliary device according to claim 7, wherein the processor determines whether a period of time subsequent to the switching display synchronous signal is a display period of time of the left-eye image or a display period of time of the right-eye image based on an interval of the switching display synchronous signal when the switching display synchronous signal is determined to be included.

9. A display system, comprising:
    a display device configured to have a switching display function of displaying a left-eye image and a right-eye image in a switching manner; and
    the display auxiliary device according to claim 1,
    wherein the display auxiliary device is configured to cooperate with the display device, and
    wherein the display device comprises:
        a processor configured to superimpose a switching display synchronous signal on an image to be displayed, and
        a display configured to display the image on which the switching display synchronous signal is superimposed.

10. The display system according to claim 9,
    wherein the processor of the display device is further configured to:
    acquire temperature information of an environment in which the display device is used; and
    notify the display auxiliary device of the acquired temperature information.

11. The display system according to claim 10, wherein the processor of the display device notifies of the temperature information by superimposing the switching display synchronous signal according to the acquired temperature information on the image to be displayed.

12. The display system according to claim 11, wherein the processor of the display device notifies of the temperature information by setting a pulse width of the switching display synchronous signal according to the acquired temperature information, and superimposing the switching display synchronous signal having the set pulse width on the image to be displayed.

13. The display system according to claim 11, wherein the processor of the display device notifies of the temperature information by setting a waveform of the switching display synchronous signal according to the acquired temperature information, and superimposing the switching display synchronous signal having the set waveform on the image to be displayed.

14. A display method of a display auxiliary device which is configured to cooperate with a display device having a switching display function of displaying a left-eye image and a right-eye image in a switching manner, the display method comprising:
- receiving, by a light receiving sensor, display light from a display target;
- determining whether or not a switching display synchronous signal is included in the received display light;
- performing a shutter switching operation of a shutter for the left-eye image and a shutter for the right-eye image to be switched and displayed, when the switching display synchronous signal is determined to be included in the received display light;
- performing a shielding operation of controlling both the shutter for the left-eye image and the shutter for the right eye-image to shield the left-eye image and the right-eye image, respectively, during an all light reception period of the switching display synchronous signal such that both the left-eye image and the right-eye image are shielded during the all light reception period of the switching display synchronous signal;
- analyzing a feature of the switching display synchronous signal;
- acquiring temperature information of an environment in which the display auxiliary device is used, based on the analyzed feature of the switching display synchronous signal; and
- changing a drive status of the shutter switching operation based on the acquired temperature information.

15. A non-transitory computer-readable recording medium having stored thereon a program that is executable by a computer of a display auxiliary device that cooperates with a display device having a switching display function of displaying a left-eye image and a right-eye image in a switching manner, the program causing the computer to perform functions comprising:
- receiving, by a light receiving sensor, display light from a display target;
- determining whether or not a switching display synchronous signal is included in the display light received through the light receiving sensor;
- performing a shutter switching operation of a shutter for the left-eye image and a shutter for the right-eye image to be switched and displayed, when it is determined that the switching display synchronous signal is included in the received display light;
- performing a shielding operation of controlling both the shutter for the left-eye image and the shutter for the right eye-image to shield the left-eye image and the right-eye image, respectively, during an all light reception period of the switching display synchronous signal such that both the left-eye image and the right-eye image are shielded during the all light reception period of the switching display synchronous signal; and
- analyzing a feature of the switching display synchronous signal;
- acquiring temperature information of an environment in which the display auxiliary device is used, based on the analyzed feature of the switching display synchronous signal; and
- changing a drive status of the shutter switching operation based on the acquired temperature information.

* * * * *

UNITED STATES PATENT AND TRADEMARK OFFICE
CERTIFICATE OF CORRECTION

PATENT NO. : 9,626,924 B2
APPLICATION NO. : 14/302144
DATED : April 18, 2017
INVENTOR(S) : Kiyoshi Oda et al.

Page 1 of 1

It is certified that error appears in the above-identified patent and that said Letters Patent is hereby corrected as shown below:

In the Specification

Column 13, Line 46, delete "right eye-image" and insert --right-eye image--.
Column 15, Line 22, delete "right eye-image" and insert --right-eye image--.
Column 16, Line 20, delete "right eye-image" and insert --right-eye image--.

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*